(12) United States Patent
Sugawara et al.

(10) Patent No.: US 8,306,742 B2
(45) Date of Patent: Nov. 6, 2012

(54) NAVIGATION SERVER

(75) Inventors: Aiko Sugawara, Tokyo (JP); Masao Kuwahara, Tokyo (JP); Hiroshi Warita, Tokyo (JP)

(73) Assignees: Honda Motor Co., Ltd., Tokyo (JP); The Foundation of the Promotion of Industrial Science, Tokyo (JP)

(*) Notice: Subject to any disclaimer, the term of this patent is extended or adjusted under 35 U.S.C. 154(b) by 428 days.

(21) Appl. No.: 12/681,726

(22) PCT Filed: Jul. 3, 2008

(86) PCT No.: PCT/JP2008/001770
§ 371 (c)(1),
(2), (4) Date: Apr. 5, 2010

(87) PCT Pub. No.: WO2009/044497
PCT Pub. Date: Apr. 9, 2009

(65) Prior Publication Data
US 2010/0211309 A1 Aug. 19, 2010

(30) Foreign Application Priority Data
Oct. 5, 2007 (JP) .................. 2007-262124

(51) Int. Cl.
*G01C 21/00* (2006.01)
*G01C 21/30* (2006.01)
(52) U.S. Cl. ......... 701/423; 701/410; 701/117; 340/988
(58) Field of Classification Search .................. None
See application file for complete search history.

(56) References Cited

U.S. PATENT DOCUMENTS
7,797,100 B2 * 9/2010 Zaitsu et al. .................. 701/117

FOREIGN PATENT DOCUMENTS
| JP | 4-17098 | 1/1992 |
| JP | 2529215 | 6/1996 |
| JP | 2005-135282 | * 5/2005 |
| JP | 2005-149052 | 6/2005 |
| JP | 2007-188353 | 7/2007 |

OTHER PUBLICATIONS

International Search Report for Application No. PCT/JP2008/001770, dated Aug. 19, 2008.

* cited by examiner

*Primary Examiner* — Luna Champagne
(74) *Attorney, Agent, or Firm* — Nelson Mullins Riley & Scarborough LLP; Anthony A. Laurentano

(57) ABSTRACT

A navigation server rapidly generating guide support information in view of a traffic state after occurrence of an accidental situation in a road section, and make a navigation device recognize the same. After occurrence of the accidental situation in a target road section, a changing pattern $g_2(t)$ of a cumulative traffic volume CQ of a second position $x_2$ during a first period is estimated, on the basis of a value of a traffic volume $Q_1$ of the target road section at the first time $t_1$. Further, a primary guide support information during the first period is generated on the basis of a standard changing pattern $g_1(t)$ of the cumulative traffic volume CQ of the first position $x_1$ and a changing pattern $g_2(t)$ of the cumulative traffic volume CQ of the second position $x_2$ as the estimation result.

8 Claims, 6 Drawing Sheets

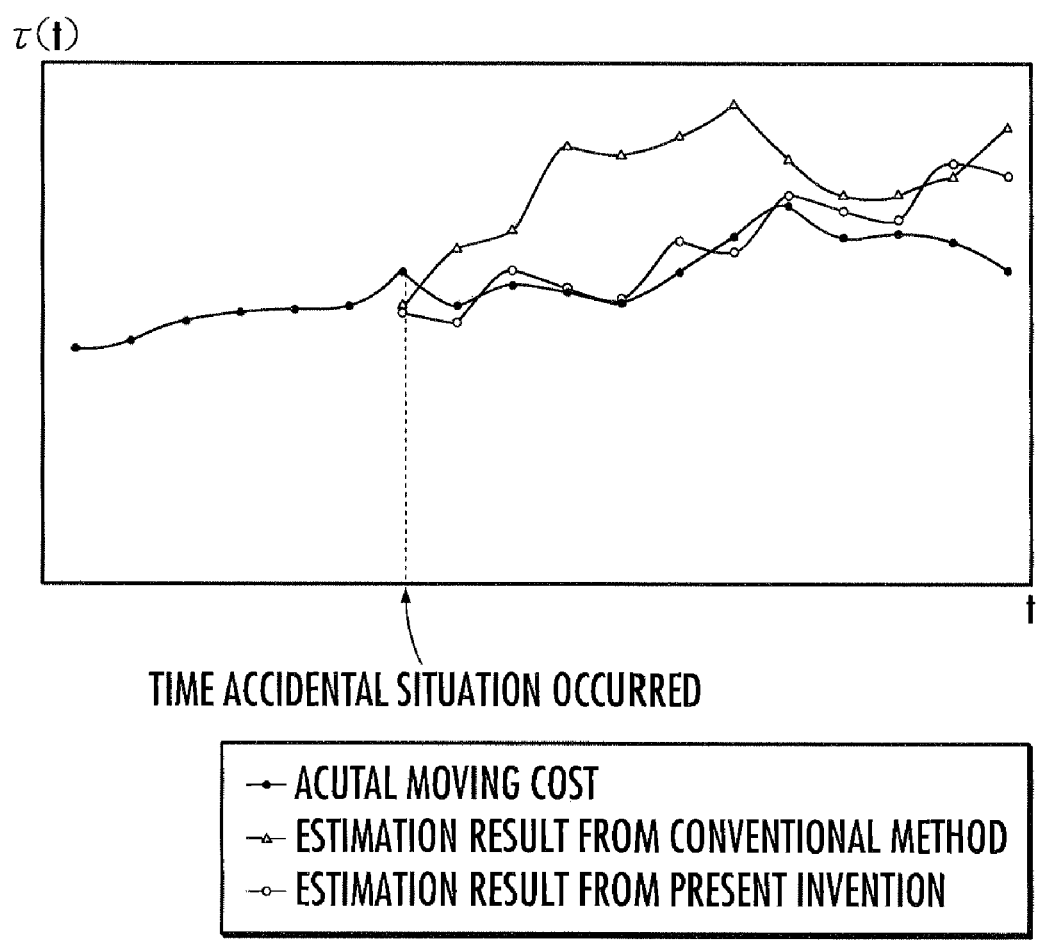

NAVIGATION SERVER

RELATED APPLICATIONS

This application is a 35 U.S.C. 371 national stage filing of International Application No. PCT/JP2008/001770, filed Jul. 3, 2008, which claims priority to Japanese Patent Application No. 2007-262124 filed on Oct. 5, 2007 in Japan. The contents of the aforementioned applications are hereby incorporated by reference.

BACKGROUND OF THE INVENTION

1. Technical Field

The present invention relates to a navigation server which supports guiding by a navigation device, on the basis of communication with the navigation device.

2. Description of the Related Art

Conventionally, there is proposed a technical method of grasping a traffic phenomenon specific to traffic jam flow, by analyzing a compression wave existing in the traffic jam flow, on the basis of traffic flow data on each of a free traveling state and a jammed traveling state (refer to Japanese Patent No. 2529215). Also, there is proposed a technical method of constructing a neural network by a learning calculation on the basis of an actual value of the traffic density in one section, and an actual value of the traffic density in a section on the downstream side from the foregoing section by one section, and estimating a traffic density according to the neural network (refer to Japanese Patent No. 3157953).

However, in the case where an accidental situation such as a temporary closure in a road such as an express way, a traffic state such as a traffic jam situation in the road thereafter becomes fluid. Therefore, a model calculation taking into consideration such fluid factor becomes necessary in order to estimate the road traffic state after occurrence of the accidental situation with high accuracy. However, when the content of the model calculation becomes complex, the information processing amount therefor becomes excessive, and there is a possibility that a long period time becomes necessary until completion of the calculation. Such situation is undesirable from a view point of estimating the road traffic state after occurrence of the accidental situation promptly, and providing the estimation result or a guide support information on the basis thereof to the navigation device promptly.

SUMMARY OF THE INVENTION

In view of the above circumstances, an object to be solved by the present invention is to provide a navigation server capable of generating an appropriate guide support information in view of a traffic state after occurrence of an accidental situation in a road section rapidly, and make a navigation device recognize the same.

According to a first aspect of the present invention, there is provided a navigation server which supports guiding by a navigation device, on the basis of communication with the navigation device, comprising: a road traffic information storing unit which stores a standard changing pattern at a first position in a target road section of a value of a first traffic state variable, the value of which changes with existence or nonexistence of a traffic jam and a level thereof, and a second traffic state variable which is a time function, as a second road traffic information; a first support processing unit which recognizes the value of the first traffic state variable in the target road section at a first time after occurrence of an accidental situation at the target road section, and estimates a changing pattern of the value of the second traffic state variable at a second position in which the accidental situation occurred during a first period commencing at the first time and terminating at a second time, on the basis of the recognition result; a second support processing unit which generates a primary guide support information with respect to a road condition between the first position and the second position during the first period, on the basis of a changing pattern of a value of the second traffic state variable at the first position as the second road traffic information, and a changing pattern of a value of the second traffic state variable at the second position as the estimation result of the first support processing unit; and a third support processing unit which makes the navigation device recognize the primary guide support information generated by the second support processing unit by communicating with the navigation device, or generates a secondary guide support information on the basis of the primary guide support information generated by the second support processing unit and makes the navigation device recognize the secondary guide support information by communicating with the navigation device.

According to the navigation server of the first aspect of the invention, after occurrence of the accidental situation in the target road section, the changing pattern of the value of the second traffic state variable at the second position during the first period is estimated, on the basis of the value of the first traffic state variable of the target road section at the first time. Thereafter, the primary guide support information during the first period is generated, on the basis of the standard changing pattern of the value of the second traffic state variable at the first position, and the changing pattern of the value of the second traffic state variable at the second position as the estimation result. The navigation device recognizes the primary guide support information or the secondary guide support information on the basis of a primary guide support information. The value of the first traffic state variable at the first time becomes an index of the existence or nonexistence of an occurrence of a traffic jam and the level of the same in the target road section after occurrence of the accidental situation. Further, the second traffic state variable is a coefficient of the first traffic state variable and time, and may be easily derived without using a complicated calculation model. Therefore, it becomes possible to promptly generate the guide support information appropriate in view of the existence or nonexistence of a traffic jam and the level of the same in the target road section after occurrence of the accidental situation, and make the navigation device recognize the same.

A navigation server of a second aspect of the invention is the navigation server of the first aspect of the invention, wherein the first support processing unit estimates a changing pattern of the value of the second traffic state variable during a second period commencing at the second time, on the basis of the first road traffic information, and the second support processing unit generates the primary guide support information with respect to one of or both of the first position and the second position during the second period, on the basis of the comparison result.

According to the navigation server of the second aspect of the invention, the changing pattern of the second traffic state variable at the second position during the second period after completion of the first period may be estimated immediately after occurrence of the accidental situation, on the basis of the estimation that the influence on the traffic situation by the occurrence of the accidental situation in the target road section is resolved by the lapse of the first period from the first time. Therefore, it becomes possible to promptly generate the guide support information appropriate in view of the existence or nonexistence of a traffic jam and the level of the same in the target road section, and make the navigation device recognize the same.

A navigation server of a third aspect of the invention is the navigation server of the first aspect of the invention, wherein the first support processing unit recognizes a traffic volume of the automobile as the value of the first traffic state variable, and estimates a changing pattern of a cumulative traffic volume of the automobile as the changing pattern of the value of the second traffic state variable, and the second support processing unit estimates the moving cost of the automobile between the first position and the second position, and generates the estimation result as the primary guide support information.

According to the navigation server of the third aspect of the invention, the changing pattern of the cumulative traffic volume representing the traffic state in the target road section after occurrence of the accidental situation is estimated promptly and with high accuracy. Further, on the basis of the estimation result, the estimated moving cost between the first position and the second position is generated as the primary guide support information. Therefore, it becomes possible to promptly generate the guide support information appropriate in view of the existence or nonexistence of a traffic jam and the level of the same in the target road section, and make the navigation device recognize the same.

A navigation server of a fourth aspect of the invention is the navigation server of the first aspect of the invention, wherein a correlation between a first travel state variable of the automobile and the first traffic state variable is stored to the road traffic information storing unit as a first road traffic information, and the first support processing unit recognizes the value of the first travel state variable of the target road section at the first time, and recognizes the value of the first traffic state variable at the first time on the basis of the recognition result and the first road traffic information.

According to the navigation server of the fourth aspect of the invention, the first traffic state variable of the target road section at the first time is recognized, on the basis of the value of the first travel state variable of the automobile in the target road section at the first time. The value of the first travel state variable at the first time precisely reflects the traffic state in the target road section after occurrence of the accidental situation. Therefore, the first traffic state variable may be recognized as a precise index of the existence or nonexistence of a traffic jam and the level of the same in the target road section after occurrence of the accidental situation. As such, it becomes possible to promptly generate the road traffic information appropriate in view of the existence or nonexistence of a traffic jam and the level of the same in the target road section after occurrence of the accidental situation, and make the navigation device recognize the same.

A navigation server of a fifth aspect of the invention is the navigation server of the fourth aspect of the invention, wherein the first support processing unit recognizes a moving velocity of the automobile as the value of the first travel state variable, recognizes the traffic volume of the automobile as the value of the first traffic state variable, and estimates a changing pattern of the cumulative traffic volume of the automobile as the changing pattern of the value of the second traffic state variable, and the second support processing unit estimates the moving cost of the automobile between the first position and the second position, and generates the estimation result as the primary guide support information.

According to the navigation server of the fifth aspect of the invention, the changing pattern of the cumulative traffic volume in the second position which becomes the index of the traffic state in the target road section thereafter is estimated promptly and with high accuracy, on the basis of the moving velocity of the automobile in the target road section after occurrence of the accidental situation. Therefore, on the basis of the estimation result, it becomes possible to promptly generate the road traffic information appropriate in view of the existence or nonexistence of a traffic jam and the level of the same in the target road section, and make the navigation device recognize the same.

A navigation server of a sixth aspect of the invention is the navigation server of the first aspect of the invention, wherein the first support processing unit recognizes the value of the second travel state variable of the automobile in the target road section at the first time, and estimates the value of the second traffic state variable of the second position at the first time, on the basis of the recognition result and the second road traffic information.

According to the navigation server of the sixth aspect of the invention, the second traffic variable of the target road section at the first time is recognized on the basis of the value of the second travel state variable of the automobile in the target road section at the first time. The value of the second travel state variable at the first time precisely reflects the traffic state in the target road section after occurrence of the accidental situation. Therefore, the changing pattern of the second traffic state variable may be estimated as a precise index of the existence or nonexistence of a traffic jam and the level of the same in the target road section after occurrence of the accidental situation. As such, it becomes possible to promptly generate the road traffic information appropriate in view of the existence or nonexistence of a traffic jam and the level of the same in the target road section after occurrence of the accidental situation, and make the navigation device recognize the same.

A navigation server of a seventh aspect of the invention is the navigation server of the sixth aspect of the invention, wherein the first support processing unit recognizes the moving cost of the automobile between the first position and the second position as the value of the second travel state variable, recognizes the traffic volume of the automobile as the value of the first traffic state variable, and estimates the changing pattern of a cumulative traffic volume of the automobile as the changing pattern of the value of the second traffic state variable, and the second support processing unit estimates the moving cost of the automobile between the first position and the second position, and generates the estimation result as the primary guide support information.

According to the navigation server of the seventh aspect of the invention, the traffic volume of the second position which becomes the index of the traffic state in the target road section thereafter is recognized on the basis of the moving cost of the automobile between the first position and the second position after occurrence of the accidental situation, and the cumulative traffic volume is estimated promptly and with high accuracy. Therefore, on the basis of the estimation result, it becomes possible to promptly generate the road traffic information appropriate in view of the existence or nonexistence of a traffic jam and the level of the same in the target road section, and make the navigation device recognize the same.

A navigation server of an eighth aspect of the invention is the navigation server of the first aspect of the invention, wherein the third support processing unit recognizes a departure position and a destination position of a user of the navigation device by communicating with the navigation device, and generates information representing a link group constituting a support route which connects the departure position and the destination position as the secondary guide support information.

According to the navigation server of the eighth aspect of the invention, the secondary guide support information appropriate in view of the traffic state after occurrence of the accidental situation in the target road section, and the departure position and the destination position of the user, and make the navigation device recognize the same.

BRIEF DESCRIPTION OF THE DRAWINGS

FIG. 7 is a view explaining an evaluation of an estimation accuracy of the moving cost.

DETAILED DESCRIPTION OF THE PREFERRED EMBODIMENTS

Figure 1:
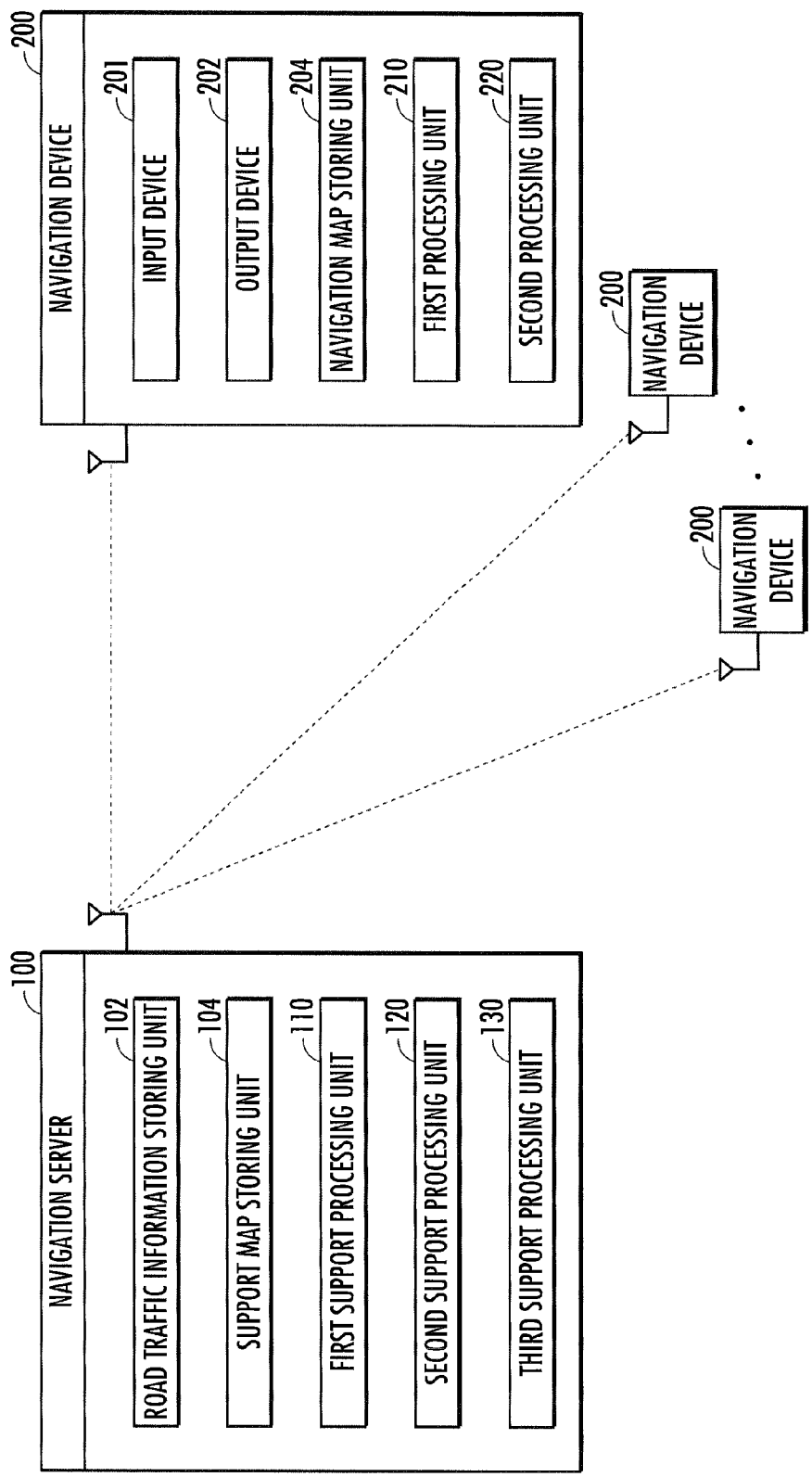
FIG. 1 is a view explaining the configuration of a navigation server according to the present invention.

An embodiment of a navigation server according to the present invention will now be explained below. A navigation server 100 shown in FIG. 1 has a communication function with a navigation device 200 mounted on a device having moving function such as an automobile or mounted on a device capable of being carried by a user. Here, the term a computer as a component such as the navigation server 100 "recognizes" information means that the component performs a possible information processing, such as the component receives the piece of information input from outside; searches the piece of information in an outside database; retrieves the piece of information from a memory device; measures, estimates, calculates the piece of information or the like via arithmetic processing on the basis of the input, received or retrieved basic information or the like; and stores in memory the piece of information or the like.

The navigation server 100 is equipped with a road traffic information storing unit 102, a support map storing unit 104, a first support processing unit 110, a second support processing unit 120, and a third support processing unit 130.

Figure 3:
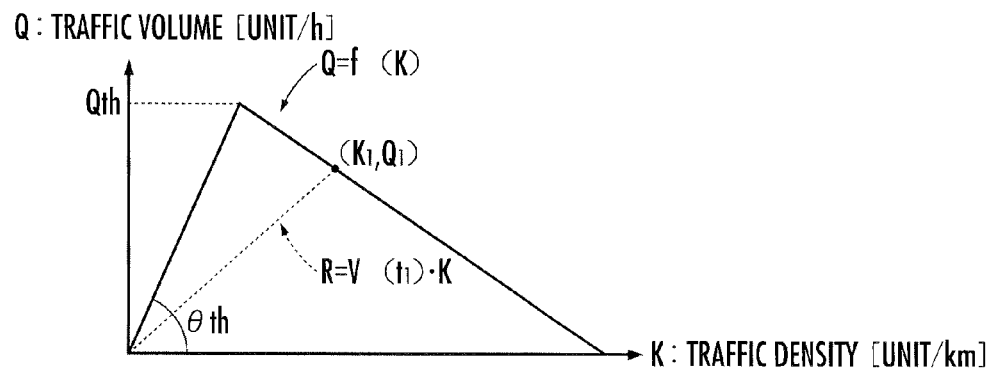
FIG. 3 is a view explaining a first road traffic information.
Figure 4:
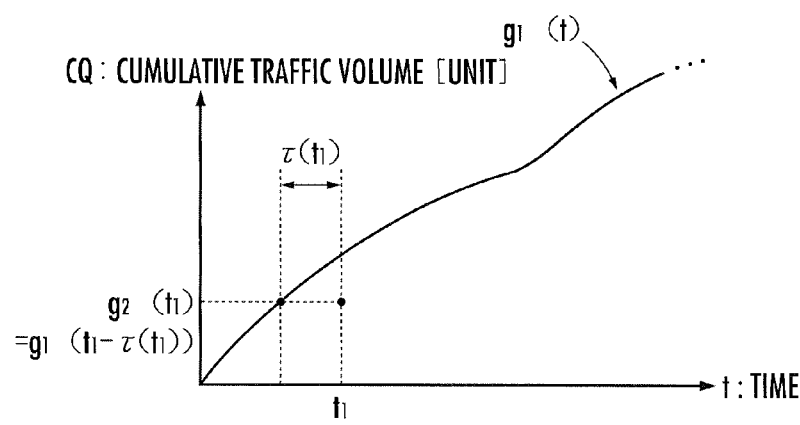
FIG. 4 is a view explaining a second road traffic information.

In the road traffic information storing unit 102, a function $Q=f(K(v))$ (K: traffic density) which represents a correlation between a moving velocity of the automobile (a first travel state variable) v and a traffic volume (a first traffic state variable) Q is stored as a first road traffic information (refer to FIG. 3). Further, in the road traffic information storing unit 102, a changing pattern (function of time t) $g_1(t)$ in one typical day of a cumulative traffic volume (a second traffic state variable) CQ at an arbitrary first position $x_1$ is stored as a second road traffic information (refer to FIG. 4). The cumulative traffic volume CQ is a time integral of the traffic volume Q, and the traffic volume Q changes in response to existence or nonexistence of an occurrence of a traffic jam and the level of the same, and may be calculated on the basis of the moving velocity v of the automobile. The first and the second road traffic information may be road traffic information generated by the first support processing unit 110 based on a probe information (position of respective probe car at each time) transmitted from a probe device mounted on a probe car or a floating car to the navigation server 100. Further, the first and the second road traffic information may be road traffic information transmitted from a road traffic information center server and the like to the navigation server 100, and may be road traffic information generated by the first support processing unit 110 based on the transmitted road traffic information.

The support map storing unit 104 is stored with a support map information. In the support map information, the location, shape and posture or the like of an individual link constituting a road are expressed by a series of coordinates ((latitude, longitude), or (latitude, longitude, altitude)). Moreover, individual link is tagged with link identifier for identifying individual link, and data representing the road type.

The first support processing unit 110 recognizes the traffic volume $Q_1$ of a second position $x_2$ in which an accidental situation such as a temporary traffic regulation occurred, at a first time $t_1$ after the occurrence of the accidental situation in a target road section. Further, on the basis of the recognition result, the first support processing unit 110 estimates a changing pattern (function of time t) $g_2(t)$ of the cumulative traffic volume CQ during a first period and a second period at the second position $x_2$. The first period is a period which commences at the first time $t_1$, and cycles terminates at the second time $t_2$. The second period is a period which commences at the second time $t_2$, and terminates at an ending time of one day or an arbitrary time earlier than the same. Each of the first period and the second period may be fixed, or may be variably set by the first support processing unit 110 on the basis of the road traffic information after the first time $t_1$.

The second support processing unit 120 estimates a moving cost $\tau(t)$ of the automobile between the first position $x_1$ and the second position $x_2$ during the first period and the second period, on the basis of a changing pattern $g_1(t)$ of the cumulative traffic volume CQ of the first position $x_1$ which is stored in the road traffic information storing unit 102 as the first road traffic information, and a changing pattern $g_2(t)$ of the cumulative traffic volume CQ of the second position $x_2$ as the estimation result by the first support processing unit 110, and generates the estimation result as a primary guide support information.

The third support processing unit 130 generates a secondary guide support information on the basis of the primary guide support information generated by the second support processing unit 120, and makes the navigation device 200 recognize the secondary guide support information by communicating with the navigation device 200. Here, the third support processing unit 130 may make the navigation device 200 recognize the primary guide support information generated by the second support processing unit 120 by communicating with the navigation device 200.

The navigation device 200 is equipped with an input device 201, an output device 202, a navigation map storing unit 204, a first processing unit 210, and a second processing unit 220.

The input device 201 is comprised of operating buttons or a microphone disposed in a center console or the like of the automobile 2, and enables a user to perform various settings by operation or voice output. The output device 202 is a display device disposed in the center console of the automobile 2 for displaying or outputting navigation map information and the like. The navigation map storing unit 204 is stored with the navigation map information or the like to be output to the output device 202. In the navigation map information, the location, shape and posture or the like of an individual link constituting a road are expressed by a series of coordinates. Moreover, individual link is tagged with the link identifier for identifying individual link. Even though the definitions of the coordinates and the like in the navigation map information and the support map information are different due to the different specifications and data architectures therebetween, it is possible to match the links by tagging the identical links with common link identifier.

The first processing unit 210 makes the navigation server 100 recognize a departure position $p_1$ and the destination position $p_2$ of the automobile, by communicating with the navigation server 100. On the basis of communication with the navigation server 100, the second processing unit 220 recognizes link groups constituting a part of a support route R connecting the departure position $p_1$ and the destination position $p_2$ which is set by the navigation server 100, as a secondary guide support information. The second processing unit 220 sets a navigation route r on the basis of the link groups and the navigation map information stored in the navigation map storing unit 204, and outputs the same to the output device 202. Here, the second processing unit 220 may recognize the primary guide support information by communicating with the navigation server 100, and may output a guide information such as the primary guide support information or the navigation route r set on the basis of the primary guide support information to the output device 202. The term the output of information means that the information is output in all possible forms enabling a human being recognize the same via five senses such as visual perception and auditory perception, such as the component displays, or auditory outputs the information and the like.

Figure 2:
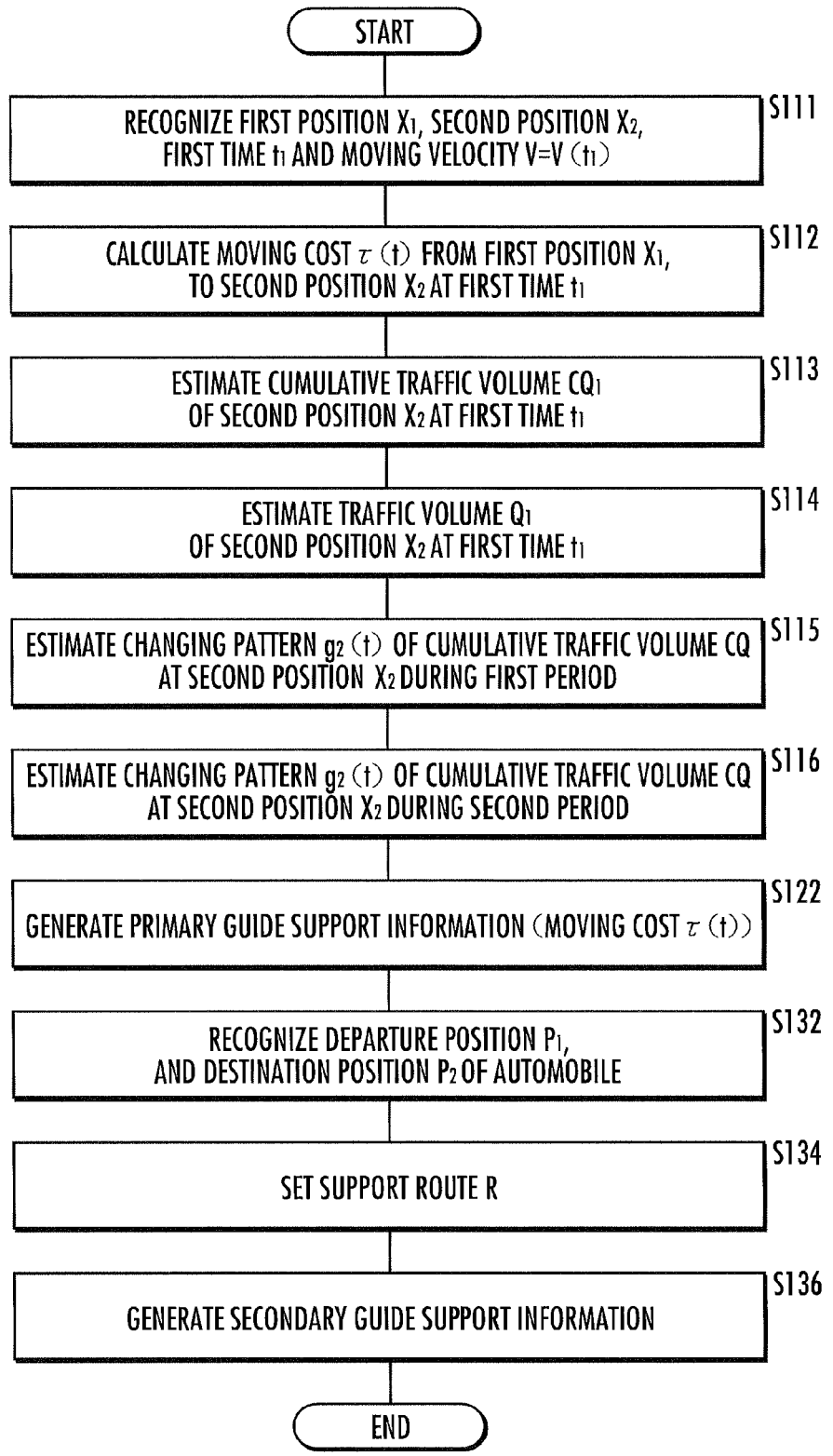
FIG. 2 is a view explaining the function of the navigation server according to the present invention.

An explanation will be given on the function of the navigation server with the above-mentioned configuration. When the accidental situation such as a temporary traffic regulation occurs at the target road section, information concerning the accidental situation is transmitted from the road traffic information center server or the floating car and the like to the navigation server 100. In response thereto, the first support processing unit 110 recognizes a starting point (the first position) $x_1$ of the target road section in which the accidental situation occurred, the position (the second position) $x_2$ where the accidental situation occurred, the time (the first time) $t_1$ after the occurrence of the accidental situation, and the moving velocity (the first travel state variable) $v=v(t_1)$ of the automobile in the vicinity of the second position $x_2$ at the first time $t_1$ (FIG. 2/S111). Further, the first support processing unit 110 recognizes a distance d of the first position $x_1$ and the second position $x_2$ along the target road section, on the basis of the support map information stored in the support map storing unit 104. Thereafter, the first support processing unit 110 calculates the moving cost (a second travel state variable) $\tau(t_1)$ of the automobile from the first position $x_1$ to the second position $x_2$ at the first time $t_1$ according to an Equation (1) (FIG. 2/S112). Here, the moving cost $\tau(t_1)$ may be included in information in relation to the accidental situation transmitted from the floating car and the like to the navigation server 100.

$$\tau(t_1)=d/v(t_1) \quad (1)$$

Further, the first support processing unit 110 estimates the cumulative traffic volume $CQ_1$ of the second position $x_2$ at the first time $t_1$ according to an Equation (2), on the basis of the moving cost $\tau(t_1)$, and the second road traffic information stored in the road traffic information storing unit 102 (FIG. 2/S113). That is, the cumulative traffic volume $CQ_1$ of the second position $x_2$ at the first time $t_1$ is estimated as a value of the changing pattern $g_1(t)$ of the cumulative traffic volume CQ of the first position $x_1$ shown in FIG. 4, at a time $t_1-\tau(t_1)$ prior to the first time $t_1$ by the moving cost $\tau(t_1)$.

$$CQ_1=g_1(t_1-\tau(t_1)) \quad (2)$$

Further, the first support processing unit 110 estimates the traffic volume $Q_1$ of the second position $x_2$ at the first time $t_1$ according to an Equation (3), on the basis of the moving velocity $v(t_1)$ of the automobile in the vicinity of the second position $x_2$ at the first time $t_1$, and the first road traffic information stored in the road traffic information storing unit 102 (FIG. 2/S114). That is, the traffic volume Q at the point of intersection between a curved line Q=f(K) indicated by a solid line in FIG. 3 and a straight line $Q=v(t_1)\cdot K$ indicating the correlation between the moving velocity $v(t_1)$ of the automobile at the first time $t_1$, the traffic density K and the traffic volume Q, which is indicated by a broken line in FIG. 3, is estimated as the traffic volume $Q_1$ of the second position $x_2$ at the first time $t_1$.

$$Q_1=f(K_1),(K_1=(f(k_1)/v(t_1))) \quad (3)$$

Further, on the basis of the estimation result, the first support processing unit 110 estimates the changing pattern $g_2(t)$ of the cumulative traffic volume CQ of the second position $x_2$ during the first period ($t_1$ to $t_2$), according to an Equation (4) (FIG. 2/S115). That is, it is estimated that the cumulative traffic volume CQ of the second position $x_2$ during the first period increases in proportion to the time t, taking the traffic volume $Q_1$ of the second position $x_2$ at the first time $t_1$ as a first proportional coefficient, as is shown in FIG. 5(a).

$$g_2(t)=Q_1\cdot(t-t_1)+CQ_1,(t_1\leq t\leq t_2) \quad (4)$$

Further, the first support processing unit 110 estimates the changing pattern $g_2(t)$ of the cumulative traffic volume CQ of the second position $x_2$ during the second period ($t_2$ and on) which continues from the first period, according to an Equation (5) (FIG. 2/S116). That is, it is estimated that the cumulative traffic volume CQ of the second position $x_2$ during the second period increases in proportion to the time t, by a second proportional coefficient $Q_2$ which is larger than the first proportional coefficient $Q_1$ as is shown in FIG. 5(b).

$$g_2(t)=Q_2(t-t_2)+CQ_2,(t_2\leq t)$$

$$(Q_1<Q_2,CQ_2=Q_1\cdot(t_2-t_1)+CQ_1) \quad (5)$$

The second support processing unit 120 generates the primary guide support information on the basis of the changing pattern $g_1(t)$ of the cumulative traffic volume CQ of the first position $x_1$ which is stored as the second road traffic information, and the changing pattern $g_2(t)$ of the cumulative traffic volume CQ of the second position $x_2$ as the estimation result by the first support processing unit 110 (FIG. 2/S122). Specifically, the moving cost $\tau(t)$ of the automobile from the first position $x_1$ to the second position $x_2$ is estimated according to an Equation (6), and generates the estimation result as the primary guide support information. That is, the moving cost $\tau(t)$ is, as is shown in FIG. 5(c), estimated as a time deviation of the two functions $g_1(t)$ and $g_2(t)$ of the common cumulative traffic volume CQ. The primary guide support information is stored in the road traffic information storing unit 102 as a supplemental road traffic information. Here, a time (a predicted traffic jam converging time) $t_3$ in which it is predicted that the moving cost $\tau(t)$ becomes 0 (or becomes equal to or lower than a threshold value) as is shown in FIG. 5(c) may be included in the primary guide support information.

$$\tau(t)=g_2^{-1}(CQ)-g_1^{-1}(CQ) \quad (6)$$

On the basis of communication with the navigation device 200, the third support processing unit 130 recognizes the departure position $p_1$ and the destination position $p_2$ of the automobile on which the navigation device 200 is mounted together with the identifier of the automobile (FIG. 2/S132). The destination position $p_2$ of the automobile is transmitted to the navigation server 100, after being set through the input device 201 and input to the navigation device 200 by the user. In the navigation device 200, the departure position $p_1$ of the automobile is measured by the first processing unit 210 as a current position at one point in time, on the basis of a GPS signal received by a communication device, or an output from an in-car acceleration sensor and rate sensor or the like, and is transmitted to the navigation server 100.

Figure 6:
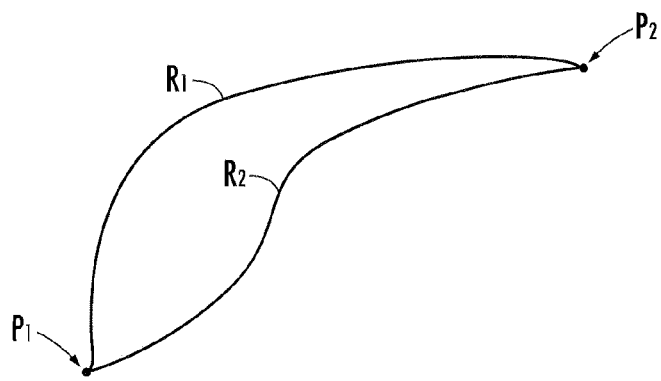
FIG. 6 is a view explaining a support route and a navigation route.
Figure 6:
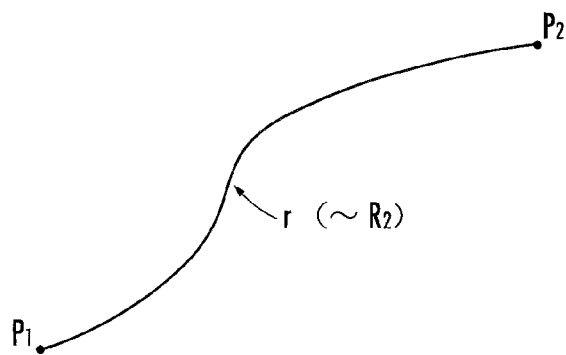
Figure 6:
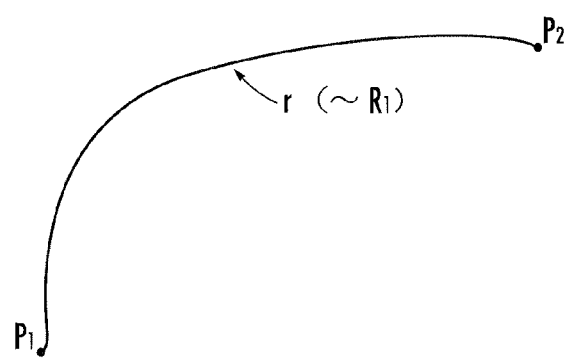

Further, the third support processing unit 130 sets one or a plurality of the support routes R connecting the departure position $p_1$ and the destination position $p_2$ of the automobile, on the basis of the support map information stored in the support map storing unit 104 (FIG. 2/S134). By doing so, for example as is shown in FIG. 6(*a*), a first support route $R_1$ and a second support route $R_2$ connecting the departure position $p_1$ and the destination position $p_2$ are set.

Further, the third support processing unit 130 generates the link identifiers indicating the link group constituting a part of the support route R as the secondary guide support information, and also makes the navigation device 200 recognize the same by communicating with the navigation device 200 (FIG. 2/S136). For example, the moving costs of the two support routes $R_1$ and $R_2$, respectively, shown in FIG. 6(*a*), are evaluated on the basis of the road traffic information including the primary guide support information stored in the road traffic information storing unit 102 (the moving cost of individual link or road section). Thereafter, the identifier of individual link included in the link group constituting a part of (or all of) the support route most appropriate from the view point of the moving cost is transmitted to the navigation device 200 mounted on the automobile identified by the above-mentioned identifier of the automobile. By doing so, a series of process at the navigation server 100 is completed. Here, the primary guide support information as it is may be delivered or broadcasted to an arbitrary navigation device 200 by the third support processing unit 130. Further, it may be constructed that whether or not an area (mesh group) including the support route R includes the target road section in which the first period and the second period has not lapsed after occurrence of the accidental situation in that area, and the primary guide support information in the target road section may be transmitted from the navigation server 100 to the navigation device 200 in the case where the determination result is positive.

Thereafter, in the navigation device 200, the second processing unit 220 sets the navigation route r connecting the departure position $p_1$ and the destination position $p_2$ of the automobile, on the basis of the secondary guide support information and the navigation map information stored in the navigation map storing unit 204, and outputs the same to the output device 202. In the case where the moving cost of the second support route $R_2$ is lower than the moving cost of the first support route $R_1$ because the target road section in which the accidental situation has recently occurred is included in the first support route $R_1$ shown in FIG. 6(*a*), the navigation route r as is shown in FIG. 6(*b*) which is identical to or substantially identical to the second support route $R_2$ is set and displayed in the output device 202. On the other hand, in the case where the moving cost of the first support route $R_1$ is lower than the moving cost of the second support route $R_2$ although the target road section in which the accidental situation has recently occurred is included in the first support route $R_1$ shown in FIG. 6(*a*), the navigation route r as is shown in FIG. 6(*c*) which is identical to or substantially identical to the first support route $R_1$ is set and displayed in the output device 202.

Figure 5:
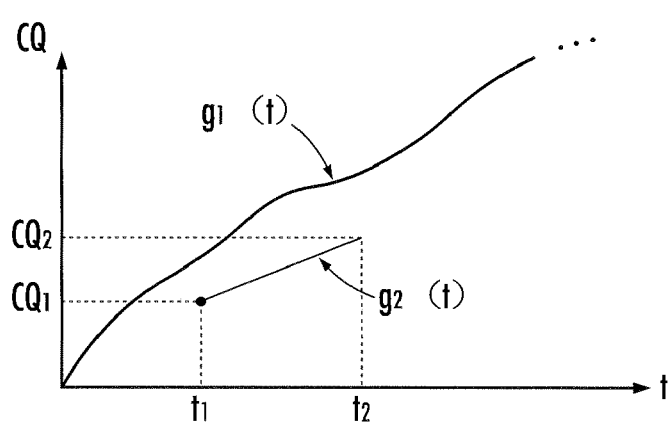
FIG. 5 is a view explaining an estimation method of a moving cost as a primary guide support information.
Figure 5:
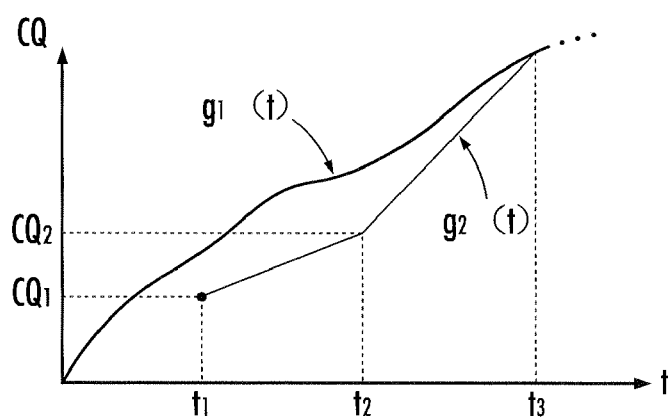
Figure 5:
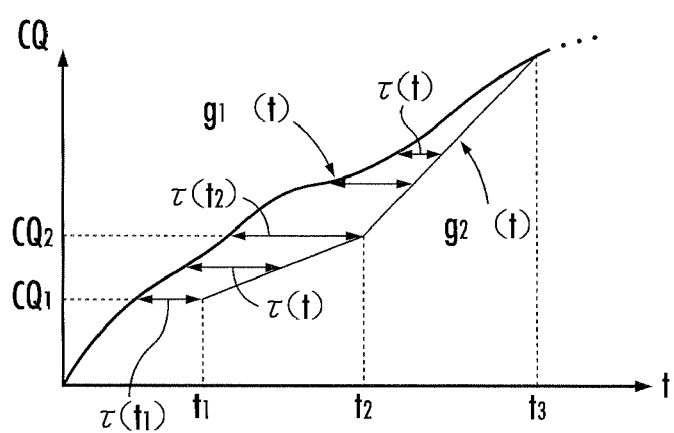

According to the navigation server exerting the above-mentioned functions, after occurrence of the accidental situation in the target road section, the changing pattern $g_2(t)$ of the cumulative traffic volume (the second traffic state variable) CQ of the second position $x_2$ during the first period is estimated, on the basis of the traffic volume (the first traffic state variable) $Q=Q_1$ in the vicinity of the second position $x_2$ at the first time $t_1$ (refer to FIG. 2/S111 through 116, FIG. 5(*a*)). Further, on the basis of the estimation that the influence on the traffic situation by the occurrence of the accidental situation in the target road section is resolved or relieved by the lapse of the first period from the first time $t_1$, the changing pattern $g_2(t)$ of the cumulative traffic volume CQ of the second position $x_2$ during the second period after completion of the first period is estimated (refer to FIG. 2/S116, FIG. 5(*b*)). Still further, the primary guide support information during the first and the second period (the predicted moving cost $\tau(t)$ from the first position $x_1$ to the second position $x_2$) is generated, on the basis of the standard changing pattern $g_1(t)$ of the cumulative traffic volume CQ of the first position $x_1$ as the first road traffic information, and the changing pattern $g_2(t)$ of the cumulative traffic volume CQ of the second position $x_2$ as the estimation result (refer to FIG. 2/S122, FIG. 5(*c*)). The traffic volume $Q_1$ of the second position $x_2$ at the first time $t_1$ becomes an index of the traffic state, such as the existence or nonexistence of an occurrence of a traffic jam and the level of the same in the target road section after occurrence of the accidental situation. Further, the cumulative traffic volume CQ is a function of the traffic volume Q and time, and may be easily derived without using a complicated calculation model. Therefore, it becomes possible to promptly generate the guide support information appropriate in view of the existence or nonexistence of a traffic jam and the level of the same in the target road section after occurrence of the accidental situation. Thereafter, it becomes possible to promptly make the navigation device 200 recognize the secondary guide support information appropriate in view of the traffic state after occurrence of the accidental situation in the target road section, and the departure position $p_1$ and the destination position $p_2$ of the automobile (eventually the user) (refer to FIG. 2/S132 through S136, FIG. 6(*a*)).

Here, an explanation is given on the evaluation result of the estimation accuracy of the moving cost $\tau(t)$ of the automobile from the first position $x_1$ to the second position $x_2$, in the case where the accidental situation occurred in the target road section. FIG. 7 shows the measurement result of the actual moving cost $\tau$ on the basis of the output signals of the sensors set in the target road section, and the estimation results of the moving cost $\tau$ from each of the method of the present invention and the conventional matching method using, for example, an accumulated data from the past in relation to the traffic volume. As is apparent from FIG. 7, the method of the present invention has higher estimation accuracy of the moving cost $\tau$ than the conventional method, in view of the deviation from the actual moving cost $\tau$.

Here, other than the traffic volume Q, a value of any variable representing the road traffic state may be recognized as the value of the first traffic state variable. Further, other than the cumulative traffic volume CQ, a value of any variable expressed as a function of the first traffic state variable and time may be recognized as the second traffic state variable. Still further, other than the estimation result of the moving cost, an estimation result of a value of any variable derived on the basis of the difference between the second traffic state variables at the first position and the second position, respectively, may be generated as the primary guide support information.

Further, in the present embodiment, the moving velocity (the first travel variable) $v=v(t_1)$ of the automobile at the first time $t_1$ is recognized, and the traffic volume $Q_1$ of the second position $x_2$ at the first time $t_1$ is estimated on the basis of the moving velocity v (refer to FIG. 2/S111, 5114, and FIG. 3), the traffic volume $Q_1$ of the second position $x_2$ at the first time $t_1$ may be transmitted to the navigation server 100 and be recognized by the first support processing unit 110 as a part of the information in relation to the accidental situation. Still further, in the present embodiment, the moving cost (the second travel state variable) $\tau = \tau(t_1)$ of the automobile from the first position $x_1$ to the second position $x_2$ at the first time $t_1$ is calculated, and the cumulative traffic volume $CQ_1$ of the second position $x_2$ at the first time $t_1$ is estimated on the basis of the moving cost $\tau$ (refer to FIG. 2/S112, 5113, and FIG. 4), the cumulative traffic volume $CQ_1$ of the second position $x_2$ at the first time $t_1$ may be transmitted to the navigation server 100 and be recognized by the first support processing unit 110 as a part of the information in relation to the accidental situation.

The invention claimed is:

1. A navigation server which supports guiding by a navigation device, on the basis of communication with the navigation device, comprising:
    a road traffic information storing unit which stores a standard changing pattern at a first position in a target road section of a value of a first traffic state variable, the value of which changes with existence or nonexistence of a traffic jam and a level thereof, and a second traffic state variable which is a time function, as a second road traffic information;
    a first support processing unit which recognizes the value of the first traffic state variable in the target road section at a first time after occurrence of an accidental situation at the target road section as a recognition result, and estimates a changing pattern of the value of the second traffic state variable at a second position in which the accidental situation occurred during a first period commencing at the first time and terminating at a second time, on the basis of the recognition result;
    a second support processing unit which generates a primary guide support information with respect to a road condition between the first position and the second position during the first period, on the basis of a changing pattern of a value of the second traffic state variable at the first position as the second road traffic information, and a changing pattern of a value of the second traffic state variable at the second position as the estimation result of the first support processing unit; and
    a third support processing unit which makes the navigation device recognize the primary guide support information generated by the second support processing unit by communicating with the navigation device, or generates a secondary guide support information on the basis of the primary guide support information generated by the second support processing unit and makes the navigation device recognize the secondary guide support information by communicating with the navigation device.

2. The navigation server according to claim 1,
    wherein the first support processing unit estimates a changing pattern of the value of the second traffic state variable during a second period commencing at the second time, on the basis of the second road traffic information, and
    the second support processing unit generates the primary guide support information with respect to one of or both of the first position and the second position during the second period.

3. The navigation server according to claim 1,
    wherein the navigation device is associated with an automobile and the first support processing unit recognizes a traffic volume of the automobile as the value of the first traffic state variable, and estimates a changing pattern of a cumulative traffic volume of the automobile as the changing pattern of the value of the second traffic state variable, and
    the second support processing unit estimates the moving cost between the first position and the second position, and generates the estimation result as the primary guide support information.

4. The navigation server according to claim 1,
    wherein the navigation device is associated with an automobile and a correlation between a first travel state variable of the automobile and the first traffic state variable is stored in the road traffic information storing unit as a first road traffic information, and
    the first support processing unit recognizes the value of the first travel state variable of the target road section at the first time, and recognizes the value of the first traffic state variable at the first time on the basis of the recognition result and the first road traffic information.

5. The navigation server according to claim 4,
    wherein the first support processing unit recognizes a moving velocity of the automobile as the value of the first travel state variable, recognizes the traffic volume of the automobile as the value of the first traffic state variable, and estimates a changing pattern of the cumulative traffic volume of the automobile as the changing pattern of the value of the second traffic state variable, and
    the second support processing unit estimates the moving cost of the automobile between the first position and the second position, and generates the estimation result as the primary guide support information.

6. The navigation server according to claim 1,
    wherein the navigation device is associated with an automobile and the first support processing unit recognizes a value of a second travel state variable of the automobile in the target road section at the first time, and estimates the value of the second traffic state variable of the second position at the first time, on the basis of the recognition result and the second road traffic information.

7. The navigation server according to claim 6,
    wherein the first support processing unit recognizes the moving cost of the automobile between the first position and the second position as the value of the second travel state variable, recognizes the traffic volume of the automobile as the value of the first traffic state variable, and estimates the changing pattern of a cumulative traffic volume of the automobile as the changing pattern of the value of the second traffic state variable, and
    the second support processing unit estimates the moving cost of the automobile between the first position and the second position, and generates the estimation result as the primary guide support information.

8. The navigation server according to claim 1,
    wherein the third support processing unit recognizes a departure position and a destination position of a user of the navigation device by communicating with the navigation device, and generates information representing a link group constituting a support route which connects the departure position and the destination position as the secondary guide support information.

* * * * *